(12) United States Patent
Panse

(10) Patent No.: US 8,090,705 B1
(45) Date of Patent: Jan. 3, 2012

(54) METHOD AND APPARATUS FOR PROCESSING ELECTRONICALLY STORED INFORMATION FOR ELECTRONIC DISCOVERY

(75) Inventor: Sunil Sharad Panse, Pune (IN)

(73) Assignee: Symantec Corporation, Mountain View, CA (US)

( * ) Notice: Subject to any disclaimer, the term of this patent is extended or adjusted under 35 U.S.C. 154(b) by 583 days.

(21) Appl. No.: 12/210,241

(22) Filed: Sep. 15, 2008

(51) Int. Cl.
*G06F 7/00* (2006.01)
*G06F 17/30* (2006.01)

(52) U.S. Cl. ........ 707/708; 707/726; 707/751; 707/767; 707/780

(58) Field of Classification Search .................. 707/708
See application file for complete search history.

(56) References Cited

U.S. PATENT DOCUMENTS

| | | | |
|---|---|---|---|
| 6,507,837 B1 * | 1/2003 | De La Huerga | 1/1 |
| 6,738,760 B1 * | 5/2004 | Krachman | 1/1 |
| 7,324,998 B2 * | 1/2008 | Beres et al. | 1/1 |
| 2006/0184512 A1 * | 8/2006 | Kohanim et al. | 707/3 |
| 2007/0078828 A1 * | 4/2007 | Parikh et al. | 707/3 |
| 2008/0235209 A1 * | 9/2008 | Rathod et al. | 707/5 |

OTHER PUBLICATIONS

"Faster Early Case Assessments," Copyright 2008 Clearwell Systems, Inc., downloaded from web site http://www.clearwellsystems.com/customers/faster-case-assessments.php on Dec. 5, 2008.
"Exterro Fusion Enterprise Edition," Copyright 2008 exterro, Inc., downloaded from web site http://www.exterro.com/solutions/enterprise.exterro on Dec. 5, 2008.
"Exterro Fusion : Collection Management," Copyright 2008 exterro, Inc., downloaded from web site http://www.exterro.com/solutions/collection.exterro on Dec. 5, 2008.

* cited by examiner

*Primary Examiner* — Don Wong
*Assistant Examiner* — Binh V Ho
(74) *Attorney, Agent, or Firm* — Campbell Stephenson LLP

(57) ABSTRACT

Method and apparatus for processing electronically stored information (ESI) for electronic discovery are described. In some examples, an electronic analysis of documents in the ESI indicated as being responsive to a search query of the ESI is performed. Results of the electronic analysis are stored in a database to provide a repository of case knowledge. Search parameters for at least one additional search query are generated automatically based on the case knowledge. The search parameters are provided as output.

16 Claims, 3 Drawing Sheets

METHOD AND APPARATUS FOR PROCESSING ELECTRONICALLY STORED INFORMATION FOR ELECTRONIC DISCOVERY

BACKGROUND OF THE INVENTION

1. Field of the Invention

The present invention relates generally to data processing. More particularly, the present invention relates to a method and apparatus for processing electronically stored information for electronic discovery.

2. Description of the Related Art

The discovery of material to be exchanged among parties as part of the discovery process during litigation can provide significant challenges, particularly with respect to electronically stored information (ESI). Court rules require parties to discover and exchange "all responsive documents". Discovery of ESI is sometimes referred to as "e-Discovery". Searching ESI is challenging due to the use of natural language text, private codes, sub-cultural differences in vocabulary, spelling mistakes, etc. Various search and retrieval techniques, such as keyword searches, Boolean searches, and even fuzzy searches, have proven to be severely inadequate due to the vague and imprecise (for searching) nature of the contents of the ESI. Information available during search query preparation is often inadequate (e.g., unknown custodians, keywords, phrases, code words, important dates, synonyms, etc.), which makes the task of creating a "sufficiently inclusive" search query difficult. This is despite the fact that the search queries and/or keywords are often mutually agreed upon between opposing parties in a litigation (e.g., during a "Meet and Confer").

Search queries may result in a large number of false positives and/or false negatives. False positives refer to irrelevant material that is nonetheless returned as a result to a search query that is not formed to retrieve such material. False negatives refer to relevant material that is not returned as a result to a search query that is formed to retrieve such material. False positives result in a high cost of recall and review of the returned material. False negatives result in responsive and relevant documents being un-collected and un-reviewed from various data sources. False negatives also force more time consuming iterations of the e-Discovery process and can prevent parties from demonstrating "reasonableness of efforts" and expose them to varying levels of legal consequences by the Courts.

Accordingly, there exists a need in the art for a method and apparatus for processing electronically stored information for electronic discovery that overcomes the aforementioned deficiencies.

SUMMARY OF THE INVENTION

Aspects of the invention relate to a method, an apparatus, and a computer readable medium for processing electronically stored information (ESI) for electronic discovery. In some embodiments, an electronic analysis of documents in the ESI indicated as being responsive to a search query of the ESI is performed. Results of the electronic analysis are stored in a database to provide a repository of case knowledge. Search parameters for at least one additional search query are generated automatically based on the case knowledge. The search parameters are provided as output.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A method, an apparatus, and a computer readable medium for processing electronically stored information (ESI) for electronic discovery are described. In some embodiments, an electronic analysis of documents in the ESI indicated as being responsive to a search query of the ESI is performed. Results of the electronic analysis are stored in a database to provide a repository of case knowledge. Search parameters for at least one additional search query are generated automatically based on the case knowledge. The search parameters are provided as output. Search queries can be generated and executed either automatically or manually. The generation and use of search parameters can be audited and reported. The generation, use, and execution of search queries can be audited and reported. These and further features are described below.

Figure 1:
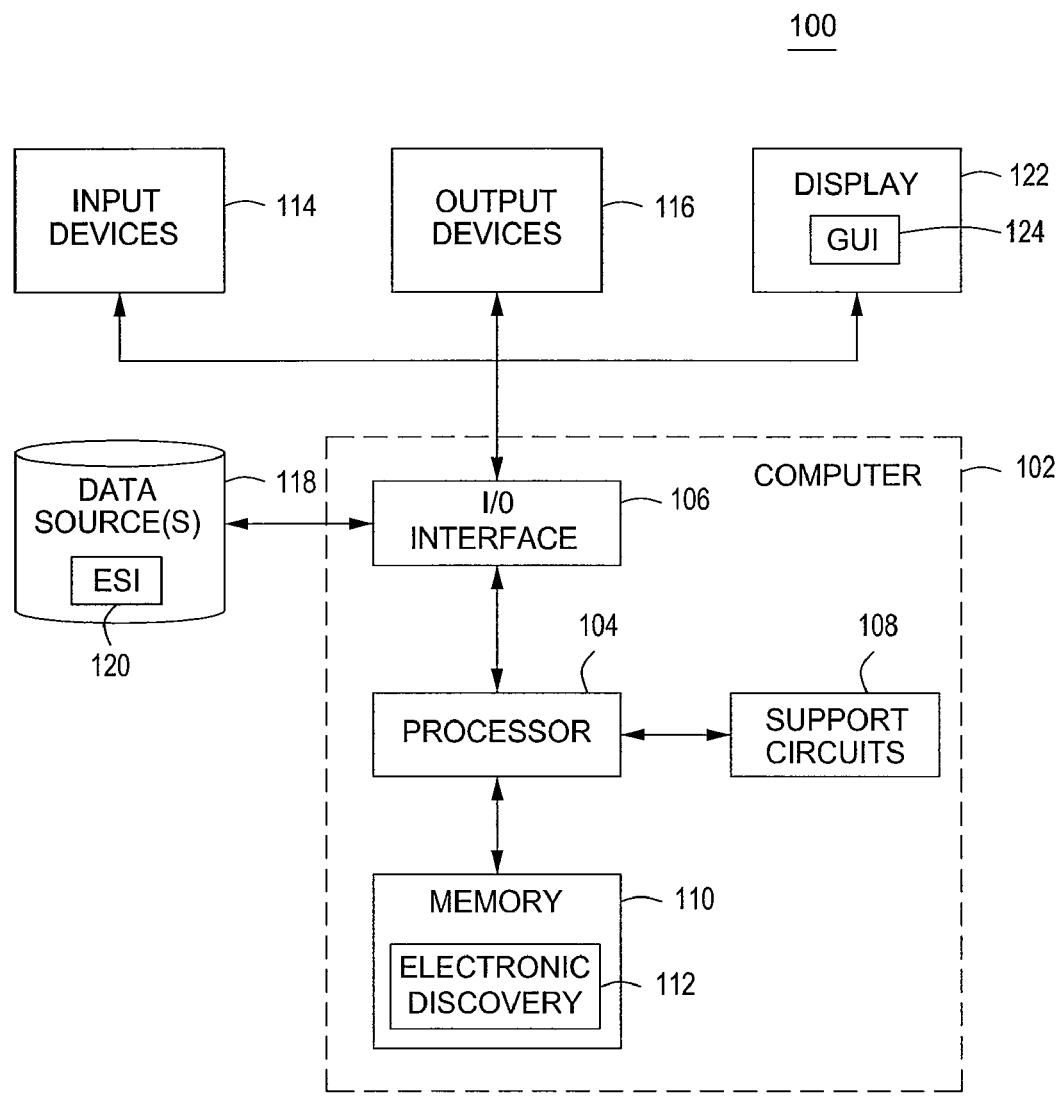
FIG. 1 is a block diagram depicting an exemplary embodiment of a computer system in accordance with one or more aspects of the invention.

FIG. 1 is a block diagram depicting an exemplary embodiment of a computer system 100 in accordance with one or more aspects of the invention. The computer system 100 includes a computer 102, one or more data sources 118, input devices 114, output devices 116, and a display 122. The computer 102 includes a processor 104, various support circuits 108, an input/output (IO) interface 106, and a memory 110. The processor 104 may include one or more microprocessors known in the art. The support circuits 108 for the processor 104 include conventional cache, power supplies, clock circuits, data registers, I/O interfaces, and the like. The I/O interface 106 may be directly coupled to the memory 110 or coupled through the processor 104. The I/O interface 106 may be configured for communication with the data sources 118, the input devices 114 (e.g., keyboard, mouse, and the like), the output devices 116 (e.g., printer, external devices, and the like), and the display 122. The memory 120 may include one or more of the following random access memory, read only memory, magneto-resistive read/write memory, optical read/write memory, cache memory, magnetic read/write memory, and the like.

The data source(s) 118 include electronically stored information (ESI) 120. The data source(s) 118 may include one or more of: data archives and backups stored on various storage devices (e.g., hard disk drives, compact discs (CDs), digital versatile discs (DVDs), FLASH memories, tapes, and the like); data stored on computers (e.g., desktop computers, portable computers, servers, etc.), data stored on other types of personal devices (e.g., cell phones, personal digital assistants (PDAs), portable storage units, etc.); and/or any other source of electronic information known in the art. The ESI may include various types of documents, such as data files, electronic mail messages, and/or any other of the various types of electronic information known in the art.

The computer 102 is configured with an electronic discovery module 112. In some embodiments, the electronic discovery module 112 comprises software configured for execution by the processor 104 to cause the computer 102 to perform a process for identifying information within the ESI 120 relevant to electronic discovery (e.g., responsive documents within the ESI 120). While the electronic discovery module 112 is described as being software executed by the processor 104, it is to be understood that the electronic discovery module 112 may be implemented using hardware (e.g., via an application specific integrated circuit (ASIC) or programmable logic device (PLD), or a combination of hardware and software. It is to be understood that the computer 102 may generally represent one or more physically distinct computers such that the electronic discovery module 112 may be distributed and executed across multiple physical computers.

In general operation, a user (e.g., a party to litigation or prospective litigation, or a legal representative of such party) interacts with the computer 102 that implements the electronic discovery module 112 using the input devices 114, the output devices 116, and/or the display 122. For example, the display 122 may include a graphical user interface (GUI) 124 to interact with the electronic discovery module 112 to identify information in the ESI 120 relevant to electronic discovery. For example, the electronic discovery module 112 may by invoked to identify responsive documents in the ESI 120, identify information related to potential data sources of ESI, identify potential types of ESI that may be relevant, and the like, as described below.

Figure 2:
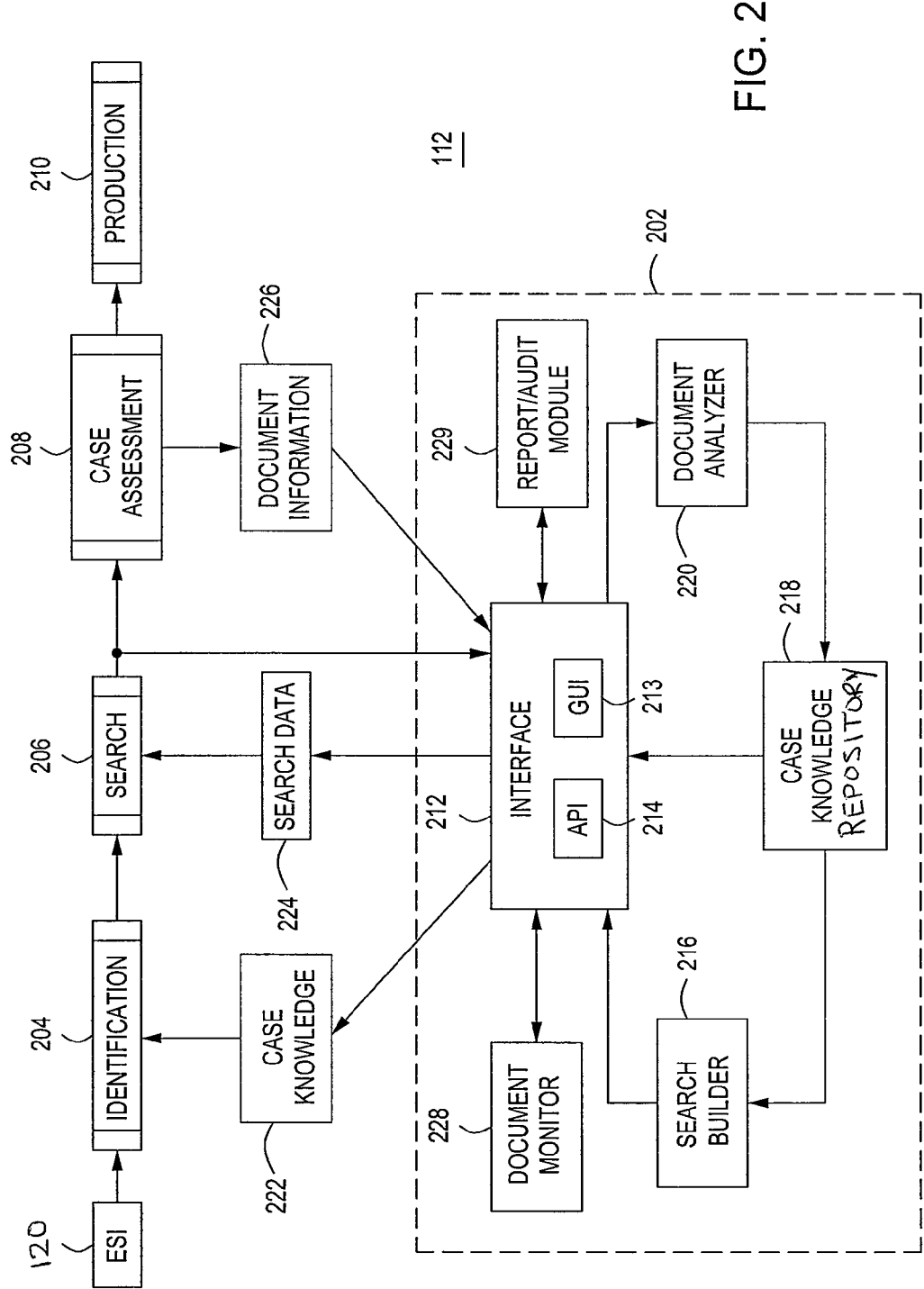
FIG. 2 is a block diagram depicting an exemplary embodiment of the electronic discovery module in accordance with one or more aspects of the invention.

FIG. 2 is a block diagram depicting an exemplary embodiment of the electronic discovery module 112 in accordance with one or more aspects of the invention. The electronic discovery module 112 includes an automated ESI processor 202, an identification module 204, a search module 206, a case assessment module 208, and a production module 210. The identification module 204 facilitates the process of learning the location of and types of ESI that the user desires to preserve and potentially disclose (e.g., in a pending or prospective legal proceeding). That is, the identification module 204 may assist in the collection of the ESI 120. The search module 206 facilitates the acquisition of documents from the ESI 120 using search queries to return potentially responsive documents. The case assessment module 208 facilitates a user's review and assessment of the potentially responsive documents retrieved by the search module 206. The production module 210 is configured to format and output responsive documents (e.g., for distribution to other parties). The identification module 204, the search module 206, the case assessment module 208, and the production module 210 may be implemented using one or more software programs (e.g., executable by the processor 104 shown in FIG. 1).

The automated ESI processor 202 includes an interface 212, a document analyzer 220, a case knowledge repository 218, a document monitor 228, a reporting/auditing module 229, and a search builder 216 The identification module 204, the search module 206, the case assessment module 208, and the production module 210 are configured for communication with the automated ESI processor 202 via the interface 212. The document analyzer 220 is configured to receive document information 226 through the interface 212. The document information 226 may be generated by the case assessment module 208. The document information may include information as to which documents in the ESI 120 are indicated by the case assessment module 208 as being responsive. For example, the search module 206 may perform one or more search queries on the ESI 120 to generate potentially responsive documents. A user may designate one or more of the potentially responsive documents as being actually responsive via interaction with the case assessment module 208.

The document analyzer 220 is configured to perform an electronic analysis of the document information 226. For example, the document analyzer 220 may identify attributes of the documents. The attributes may include: (1) attributes related to one or more persons associated with the documents (e.g., document authors, document recipients, etc.); (2) attributes related to files including the documents (e.g., creation date, modification date, etc.); and/or (3) attributes related to the text contents of the documents (e.g., keywords, topics, conversations, threads, phrases, etc.). The document analyzer 220 may derive new attributes, such as date range from creation/modification date, stemmed keywords, counts of responsive documents per author, etc, by analyzing existing attributes. The document analyzer 220 may be implemented using one or more software programs, each of which may be either internal to the automated ESI processor 202 or external to the automated ESI processor 202. The document analyzer 220 is configured to store the results of the electronic analysis in the case knowledge repository 218.

In some embodiments, the interface 212 includes a graphical interface 213 (e.g., as part of the GUI 124) to provides a visual mechanism for a user to analyze responsive documents and designate attributes to be stored in the case knowledge repository 218. For example, the graphical interface 213 may provide a visual mechanism for highlighting a code word, phrase, keyword, or the like within the responsive documents. In some embodiments, the graphical interface 213 can facilitate one or more of three functions: (1) The case knowledge repository 218 can be used by a GUI of the case assessment module 208 to visually highlight attributes (e.g., keywords, individual custodian names, etc.) that have also been found in documents previously identified as being responsive. (2) The user can be provided with a visual mechanism to select/highlight keywords in the GUI of the case assessment module 208 and add the keywords to the case knowledge repository 218. This allows large numbers of reviewers to provide search parameters back to the search module 206 to create "sufficiently inclusive" iterative search queries. (3) The case knowledge repository 218 can be used by a GUI of the search module 206 during manual creation/modification of search queries. Various attributes, search parameters, etc. stored in the case knowledge repository 218 can be provided as a list of input options during manual creation/modification of search queries. Various views (timeline view, social networking view, etc.) can be shown to the user to determine correct search parameters for manual creation/modification of search queries.

In some embodiments, the interface 212 includes an application programming interface (API) 214. The API 214 may be configured to provide an interface to the case knowledge repository 218. For example, the document analyzer 220 may be implemented using one or more programs (e.g., external to the module 202 or internal to the module 202. The program(s) of the document analyzer 220 may receive/use the document information 226 as an input and perform electronic analysis on the document information 226. The program(s) of the document analyzer 220 may access the case knowledge repository 218 using the API 214 to store the results of electronic analysis of responsive documents therein. As such, the document analyzer 220 is extensible in that any number of programs may be used to analyze responsive documents and obtain attributes for storage in the case knowledge repository 218 using the API 214.

The case knowledge repository 218 is configured to store case knowledge collected by the document analyzer 220 and/or attributes directly identified by reviewers using the document analyzer 220. In some embodiments, the case knowledge repository 218 implements a relational database. The case knowledge may comprise relations between the attributes collected by the document analyzer 220 and documents in the ESI 120. The case knowledge repository 218 may provide an extensible schema for storing the attributes and results of various analyses that may be performed on the attributes. Case knowledge that may be stored in the case knowledge repository 218 may include, but is not limited to: authors of responsive documents, recipients of responsive documents, the number of responsive documents per author, file creation/modification dates for responsive documents, conversation identifiers, concepts from responsive documents (e.g., subjects, themes, etc.), lists of attributes identified for each of the responsive documents and derived attributes such as date range from creation/modification dates, stemmed keywords and the like. Various analyses that may be performed include, but are not limited to: time line analysis, social networking analysis, individual custodian (person) analysis, conversation/thread analysis, and the like. The case knowledge repository 218 may be stored in the memory 110 of the computer 102 or any other type of computer readable storage device(s).

In some embodiments, the interface 212 provides access to the case knowledge repository 218 for external programs via the API 214. For example, program(s) of the identification module 204 may use the API 214 to query the case knowledge repository 218 to obtain case knowledge 222. For example, the identification module 204 may query the case knowledge repository 218 for all documents having a particular author, or all documents having a particular file creation date, or all documents with particular keyword(s), or any other of a myriad of possible queries for case knowledge. In some embodiments, the graphical interface 213 provides a visual interface of the case knowledge in the case knowledge repository 218 to perform queries, analyses, and the like of the case knowledge. For example, the identification module 204 may use the graphical interface 213 to perform queries or any of the analyses described above (e.g., timeline analysis). Results of the queries/analyses may be visually represented in various formats, such as histograms, reports, social network diagrams showing communication patterns between custodians, timeline diagrams showing communication frequency between various custodians, a person view, or any other of a myriad of possible formats. The identification module 204 may use the case knowledge 222 retrieved from the case knowledge repository 218 to assist in discovering yet un-discovered documents, data sources, custodians, and the like, all of which may be newly identified using the case knowledge 222 from various data sources 120 (in FIG. 1).

In another example, the search module 206 may use the API 214 to query and/or analyze the case knowledge repository 218 to obtain search data 224. The search data 224 may include parameters that can be used to formulate search queries on the ESI 120. The search module 206 may also use the graphical interface 213 to perform queries and other analyses on the case knowledge repository 218 to obtain the search data 224. The parameters in the search data 224 may be used as training parameters to formulate particular search queries on the ESI 120 to search and recall additional, yet un-collected ESI. While the identification module 204 and the search module 206 are provided as examples, it is to be understood that any program or module may access the case knowledge repository 218 via the API 214 and/or the graphical interface 213 to obtain case knowledge for various uses to facilitate the discovery process.

The search builder 216 is configured to automatically generate search parameters based on the case knowledge in the case knowledge repository 218. The automatically generated search parameters may be provided in the search data 224 to the search module 206. The search data 224 may be accessed by the search module 206 using the API 214 and/or the graphical interface 213. The automatically generated search parameters may be used to form one or more additional queries on the ESI 120 to locate additional potentially responsive documents. The search module 206 can be configured to run the iteratively created search queries automatically. The search module 206 can provide an option through the graphical interface 213 to modify iteratively created search queries and run such queries manually. Additional responsive documents may then be analyzed as described above and the attributes thereof added to the case knowledge repository. The search builder 216 may then produce additional search parameters, which can be further used to generate search queries, and the process repeated. In this manner, the search builder 216 facilitates successive searches of the ESI each accounting for updated information obtained from responsive documents. The automatically generated search parameters may be used as training parameters to form the additional queries. For example the automatically generated search parameters may include newly identified keywords, newly identified custodians, newly identified responsive documents, newly identified user information, such as credit card numbers, social security numbers, keywords with high frequency of occurrence, or any other of a myriad of new information. The search data 224, including the automatically generated search parameters, may be graphically displayed using one or more visual representations on the graphical interface 213.

In some embodiments, the automated ESI processor 202 may include a document monitor 228. The document monitor 228 may be configured to monitor potentially responsive documents produced by the search module 206 via the interface 212. In some embodiments, the document monitor 228 may tag the potentially responsive documents with an indication that such documents should be held for litigation purposes (i.e., a "litigation hold"). Such a litigation hold tag may ensure that such documents are not discarded or otherwise lost. The document monitor 228 may perform such tagging automatically after each set of potentially responsive documents is produced by the search module 206. This can ensure that the documents are held even if a user has not finished analyzing and review the documents (e.g., via the case assessment module 208) to identify responsive documents.

The reporting/auditing module 229 is configured to monitor the use of case knowledge in the case knowledge repository 218 by the identification module 204, the search module 206, search builder 216, and/or the case assessment module 208. The reporting/auditing module 229 can audit such use and provide reports indicating such use. For example, the reporting/auditing module 229 can audit use of case knowledge by the identification module 204 to identify new custodians, data sources, etc. The reporting/auditing module 229 can audit the use of case knowledge by the search module 206 to collect possibly responsive, yet un-collected documents. Such auditing and reporting can allow parties to demonstrate "reasonableness of efforts" if required by Courts. That is, the reporting/auditing module 229 can allow parties to demonstrate to the Courts and to opposing parties that such parties have searched beyond what was required or agreed upon (e.g., during a "Meet and Confer"). Given such audits and reports, a Court may decide to show leniency in case an opposing party is able to produce a document that was not returned as responsive during discovery (e.g., the Court may not treat such an omission as an attempt to hide or tamper with the facts).

Figure 3:
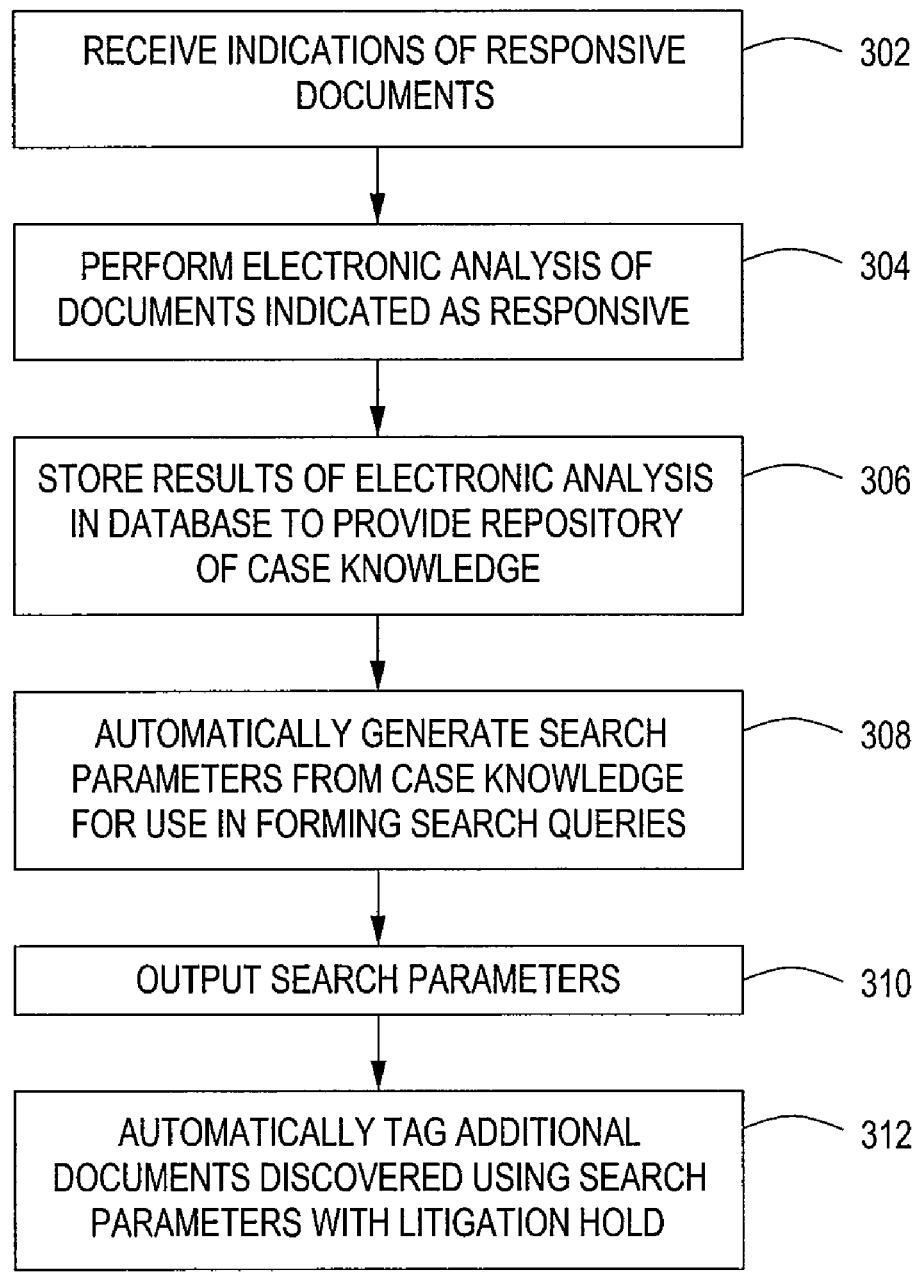
FIG. 3 is a flow diagram depicting an exemplary embodiment of a method for processing ESI for electronic discovery in accordance with one or more aspects of the invention.

FIG. 3 is a flow diagram depicting an exemplary embodiment of a method 300 for processing ESI for electronic discovery in accordance with one or more aspects of the invention. The method 300 may be performed by the electronic discovery module 112 (example shown in FIG. 2) implemented by the computer 102 shown in FIG. 1. The method 300 begins at step 302, where indications of responsive documents are received. For example, a search query may be performed to identify potentially responsive documents, and such potentially responsive documents may be assessed and reviewed to identify responsive documents. At step 304, an electronic analysis of the documents in the ESI indicated as being responsive is performed. In some embodiments, the electronic analysis includes identification of attributes in the documents. The attributes may include one or more of: attributes related to one or more persons (e.g., custodians) associated with the documents; attributes related to files including the documents (e.g., creation/modification dates); or attributes related to text contents of the documents (e.g., keywords, codes, themes, subjects, concepts, etc.). Step 304 may be performed automatically by the document analyzer 220, as described above.

At step 306, results of the electronic analysis are stored in a database to provide a repository of case knowledge. In some embodiments, the database comprises a relational database. The case knowledge may include relations between the attributes and documents in the ESI. The database may be stored in the memory 110 of the computer 102 or any other type of computer readable storage device or devices.

At step 308, search parameters are generated automatically based on the case knowledge for use in at least one search query. The search parameters may be automatically generated by the search builder 216, as described above. At step 310, the search parameters are output. The search parameters may be output via the interface 212, described above. For example, the responsive documents may be identified from an initial search query of the ESI, and the electronic analysis thereof may yield case knowledge that is used to generate search parameters for at least one additional search query. The newly generated search query may be used to search and recall possibly responsive, yet un-collected documents from various data sources. Thus, a feedback mechanism is provided whereby further possibly more relevant searches of the ESI may be performed based on analysis of previous results. At an optional step 312, additional documents identified based on one or more search queries of the ESI may be automatically tagged with an indication that the additional documents should be held for litigation (litigation hold). The litigation hold tagging may be performed by the document monitor 228, as described above.

Aspects of the methods described above may be implemented as a program product for use with a computer system. Program(s) of the program product defines functions of embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); and (ii) alterable information stored on writable storage media (e.g., floppy disks within a diskette drive or hard-disk drive or read/writable CD or read/writable DVD). Such computer readable media, when carrying computer-readable instructions that direct functions of the invention, represent embodiments of the invention.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer implemented method, comprising:
identifying a set of documents from electronically stored information (ESI), wherein the set of documents is responsive to a request for electronic discovery;
performing an electronic analysis of the set of documents, wherein the performing the electronic analysis further comprises
identifying attributes of the set of documents;
storing results of the electronic analysis in a repository of case knowledge, wherein the results comprise the attributes;
automatically generating search parameters for at least one search query based on the repository of case knowledge;
providing the search parameters as output;
identifying an additional set of documents from the ESI, wherein
the identifying the additional set of documents comprises performing the at least one search query against the ESI,
the at least one search query comprises the search parameters,
the additional set of documents is identified by the at least one search query, and
the additional set of documents is responsive to the request for electronic discovery;
automatically tagging the additional set of documents with an indication that the additional set of documents should be held for litigation;
storing the search parameters in the repository of case knowledge; and
monitoring use of the repository of case knowledge to produce audit information.

2. The method of claim 1, wherein the attributes comprise one or more of: (1) attributes related to one or more persons associated with the set of documents; (2) attributes related to files comprising the set of documents; (3) attributes related to text contents of the set of documents; (4) newly identified attributes; (5) stemmed keywords; and (6) counts of responsive documents.

3. The method of claim 2, wherein
the repository of case knowledge comprises a relational database, and
the repository of case knowledge is accessible via an application programming interface (API).

4. The method of claim 1, wherein
the performing the electronic analysis further comprises identifying relationships between the attributes of the set of documents, and the results comprise the relationships between the attributes.

5. The method of claim 1, wherein
the identifying the set of documents comprises performing an initial search query against the ESI,
the set of documents is identified by the initial search query, and the initial search query is based on the request for electronic discovery.

6. The method of claim 1, wherein
the providing the search parameters as output comprises:
  graphically displaying the search parameters using at least one visual representation.

7. The method of claim 1, wherein
the performing the electronic analysis further comprises:
  providing a graphical interface for visually selecting one or more of the attributes of the set.

8. An apparatus, comprising:
  means for identifying a set of documents from electronically stored information (ESI), wherein
    the set of documents is responsive to a request for electronic discovery;
  means for performing an electronic analysis of the set of documents, wherein
    the means for performing the electronic analysis further comprises means for identifying attributes of the set of documents;
  means for storing results of the electronic analysis in a repository of case knowledge, wherein the results comprise the attributes;
  means for automatically generating search parameters for at least one search query based on the repository of case knowledge;
  means for providing the search parameters as output;
  means for identifying an additional set of documents from the ESI, wherein
    the means for identifying the additional set of documents further comprises
      means for performing the at least one search query against the ESI
      the at least one search query comprises the search parameters, and
      the additional set of documents is identified by the initial search query, and
      the additional set of documents is responsive to the request for electronic discovery; and
  means for automatically tagging the additional set of documents with an indication that the additional set of documents should be held for litigation;
  means for storing the search parameters in the repository of case knowledge; and
  means for monitoring use of the repository case knowledge to produce audit information.

9. The apparatus of claim 8, wherein the attributes comprise one or more of: (1) attributes related to one or more persons associated with the set of documents; (2) attributes related to files comprising the set of documents; (3) attributes related to text contents of the set of documents; (4) newly identified attributes; (5) stemmed keywords; and (6) counts of responsive documents.

10. The apparatus of claim 9, wherein
the repository of case knowledge comprises a relational database, and
the repository of case knowledge is accessible via an application programming interface (API).

11. The apparatus of claim 8, wherein
the means for performing the electronic analysis further comprises
  means for identifying relationships between the attributes of the set of documents, and
  the results comprise the relationships between the attributes.

12. The apparatus of claim 8, wherein
the means for identifying the set of documents further comprises
  means for performing an initial search query against the ESI, and
  the set of documents is identified by the initial search query, and
  the initial search query is based on the request for electronic discovery.

13. The apparatus of claim 8, wherein
the means for providing the search parameters as output further comprises:
  means for graphically displaying the search parameters using at least one visual representation.

14. The apparatus of claim 8, wherein
the means for performing the electronic analysis further comprises:
  means for providing a graphical interface for visually selecting one or more of the attributes of the set of documents.

15. A computer readable medium having instructions stored thereon that, when executed by a processor, cause the processor to perform a method, comprising:
  identifying a set of documents from electronically stored information (ESI), wherein the set of documents is responsive to a request for electronic discovery;
  performing an electronic analysis of the set of documents, wherein the performing the electronic analysis further comprises identifying attributes of the set of documents;
  storing results of the electronic analysis in a repository of case knowledge, wherein the results comprise the attributes;
  automatically generating search parameters for at least one search query based on the repository of case knowledge;
  providing the search parameters as output;
  identifying an additional set of documents from the ESI, wherein the identifying the additional set of documents comprises
    performing the at least one search query against the ESI,
    the at least one search query comprises the search parameters,
    the additional set of documents is identified by the at least one search query, and the additional set of documents is responsive to the request for electronic discovery;
  automatically tagging the additional set of documents with an indication that the additional set of documents should be held for litigation;
  storing the search parameters in the repository of case knowledge; and
  monitoring use of the repository of case knowledge to produce audit information.

16. The computer readable medium of claim 15, wherein the attributes comprise one or more of: (1) attributes related to one or more persons associated with the set of documents; (2) attributes related to files comprising the set of documents; (3) attributes related to text contents of the set of documents; (4) newly identified attributes; (5) stemmed keywords; and (6) counts of responsive documents.

* * * * *